United States Patent
Araujo et al.

(10) Patent No.: US 6,463,071 B1
(45) Date of Patent: Oct. 8, 2002

(54) METHOD AND SYSTEM TO COMMUNICATE PRIORITIZED TRAFFIC VIA FIXED LENGTH DATA COMMUNICATION FRAMES

(75) Inventors: Kenneth Araujo, Sunnyvale; Peter Si-Sheng Wang, Cupertino, both of CA (US)

(73) Assignee: 3Com Corporation, Santa Clara, CA (US)

(*) Notice: Subject to any disclaimer, the term of this patent is extended or adjusted under 35 U.S.C. 154(b) by 0 days.

(21) Appl. No.: 09/136,104

(22) Filed: Aug. 17, 1998

(51) Int. Cl.⁷ .................................................. H04J 3/16
(52) U.S. Cl. ..................... 370/437; 370/474; 370/486
(58) Field of Search ................................ 370/437, 318, 370/395, 235, 474, 401, 486, 508; 455/445; 711/158

(56) References Cited

U.S. PATENT DOCUMENTS 5,412,660 A * 5/1995 Chen et al. ................ 370/318
5,471,474 A * 11/1995 Grobicki et al. ............ 370/437
6,075,787 A * 6/2000 Bobeck et al. .............. 370/395

* cited by examiner

*Primary Examiner*—Hassan Kizou
*Assistant Examiner*—John PezzLo
(74) *Attorney, Agent, or Firm*—Wagner Murabito & Hao LLP

(57) ABSTRACT

A communications network operating in a data cable system that transmits a data over cable media access control (MAC) frame with an Ethernet/ISO8802-3 type packet protocol data unit payload. Time frames for transmission of data over the network are allocated to cable modems and time frames originally allocated to a cable modem for transmission of lower priority data can be utilized to transfer high priority data while aborting the transmission of lower priority data. A high level data link control (HDLC) section is coupled immediately before a cyclical redundancy check (CRC) to indicate that all data packet protocol data units (PDU) that are encapsulated by HDLC flags is high priority data that is not to be discarded and other data is to be abandoned.

20 Claims, 8 Drawing Sheets

| Length Indicator 211 | Aborted Data 217 | High Priority Message Indicator 216 | High Priority Message 215 | High Priority Message Indicator 214 | Transmission Status 213 |
|---|---|---|---|---|---|

210

| Length Indicator 211 | Data 212 | Transmission Status 213 |

FIG. 2A

| Length Indicator 211 | Aborted Data 217 | High Priority Message Indicator 216 | High Priority Message 215 | High Priority Message Indicator 214 | Transmission Status 213 |
|---|---|---|---|---|---|

FIG. 2B

METHOD AND SYSTEM TO COMMUNICATE PRIORITIZED TRAFFIC VIA FIXED LENGTH DATA COMMUNICATION FRAMES

FIELD OF THE INVENTION

The present invention relates to the field of data communication. More particularly, the present invention relates to a method and system to communicate prioritized data traffic over a communications network via a data communication frame.

BACKGROUND OF THE INVENTION

Communication networks are an essential tool for generating prosperity in a modern society. Communication networks have become virtually indispensable in building a thriving economy because they allow users to readily gain access to and exchange information of all types (e.g., sound, text, numerical data, video, graphics, multimedia, etc.). Information transmitted over communication networks is utilized in the performance of a number of functions, including the conveyance and analysis of ideas and trends in most areas of business, science, education and entertainment. Efficient communication of information has facilitated increased productivity and reduced costs in numerous activities. The speed at which data is communicated has a significant impact on the efficiency of a communication network.

One way to improve the performance of a communication network is to increase its bandwidth, the speed at which data can be transmitted over a communication network. Larger bandwidth communication networks can transmit more data in a shorter period of time. However, upgrading communication networks to provide increased bandwidth capacity is usually an expensive, time-consuming, and disruptive process. It typically entails discarding older equipment and replacing it with newer, faster, and more costly models. Replacing major infrastructure communication networks such as telephone or coaxial cable networks with new facilities such as overhead or underground cabling is very expensive. Furthermore, advanced networks are typically harder to maintain, service, and administer.

Upgrades are not undertaken lightly and in the meantime, users generally suffer through frustratingly slow response times and congestion problems in most older communication networks. Further complicating matters is the fact that communication networks often experience high activity and traffic at certain peak operating times. For example, a communication network's resources are usually pushed to capacity when numerous multiple devices attempt to log onto and transmit data over the network simultaneously or when an application is transmitting a very large file in a burst. When the amount of data to be transmitted exceeds a network's bandwidth, the network becomes overloaded and the time or "latency" for transmitting a packet of data increases dramatically. It is very difficult to predict and prevent the occurrence of these traffic peaks.

In an effort to minimize the impact of surges in traffic and to generally manage the overall traffic on a network, it is common for a network to include storage buffers to temporarily store the data before a transmission. If the network is currently to busy to handle the data, it is queued up in buffers. Enqueued data must wait in turn until the opportunity arises for it to be sent over the network. The basic operating principle of a queue is the items first in are those first out (FIFO). Although the queue buffers are beneficial, they still do not solve all potential communication transmission problems in a network.

In many instances the queue buffers actually operate in a manner that detracts from optimized data flow, especially when handling high priority data traffic. Usually, some of the data to be transmitted over a communication network is more important or has a higher priority than other data. For example, key network administration data, such as communication network control information, can be critical to the operation of the communication network. In addition, other components coupled to a communications network often have operational constraints and it is critical to the performance of these devices that certain data be transmitted within latency tolerances, data transfer bandwidth requirements, etc. Data comprising important information should be transmitted expeditiously in order to keep the communication network and components or devices coupled to it operating properly.

Another detrimental aspect of buffers is their capacity limitations. Including the queue buffers in a communications network increases the costs of manufacturing network devices. Hence, designers typically try to limit the number of queue buffers that are installed in a communications network. Restricting buffer capacity gives rise to increases in instances when the buffers are full. As long as the buffers are full, successive information cannot be queued for eventual transmission over the network. Data that is not entered in a buffer queue is dropped or the device it originated from has to keep attempting to get it entered into a queue buffer. During instances when the queue buffers are full with lower priority data, such as information related to non-critical activities, e-mail messages, etc., higher priority data can not be transmitted. Therefore, in limiting the number of queue buffers, designers attempt to balance the pros and cons of adding buffers and calculate the optimum amount of queue buffers from a cost benefit point of view.

Communication problems resulting from a limited number of buffers and the FIFO nature of queues are magnified in communications networks comprising limited communication paths. Usually such communication networks are administered in a manner that permits only one device or entity to communicate on a path at a time and devices typically have to compete for communication network resources. Delays incurred while a device waits to obtain access to network resources increases the detrimental affects of queuing high priority traffic behind lower priority traffic in a buffer queue. In addition to waiting for lower priority data to clear out of the queue, once high priority data reaches the top of the queue it must wait while network resources become available.

What is required is a system and method that permits higher priority data to be transmitted ahead of lower priority data included in fixed length data communication frames. The system or method should enable the higher priority information to be transmitted in a manner that minimizes impacts to communication flow and conserves communication network resources. For example, it should be applicable to existing communication networks in a manner that preserves the usefulness of current communication protocols while minimizing adverse affects on network infrastructure.

SUMMARY OF THE INVENTION

The present invention is a system and method that permits higher priority data to be transmitted before a lower priority data included in fixed length data communication frames. The present system and method enables the higher priority information to be transmitted in a manner that minimizes impacts to communication flow and conserves communication network resources. It is capable of being incorporated in existing communication networks in a manner that preserves the usefulness of current communication protocols while minimizing adverse affects on network infrastructure.

In one embodiment, the present invention is a communications network system and method operating in a data cable system that transmits a data over cable media access control (MAC) frame with an Ethernet/[ISO8802-3] type packet protocol data unit payload. Time frames for transmission of data over the communication network are allocated to cable modems and time frames originally allocated to a cable modem for transmission of lower priority data can be utilized to transfer high priority data while aborting the transmission of lower priority data. A high level data link control (HDLC) section is coupled immediately before a cyclical redundancy check (CRC) to indicate that packet protocol data units (PDU) that are encapsulated by HDLC flags include high priority data that is not to be discarded.

DESCRIPTION OF THE DRAWINGS

The accompanying drawings which are incorporated in and form a part of this specification, illustrate embodiments of the invention and together with the description, serve to explain the principles of the invention:

FIG. 2A is a block diagram of one embodiment of a fixed length data communication frame.

FIG. 2B is a block illustrating another embodiment of a fixed length data communication frame for transmitting high priority data in a frame that was originally designated for use in transmitting low priority data.

BEST MODE FOR CARRYING OUT THE INVENTION

Reference will now be made in detail to the preferred embodiments of the invention, a method and system to communicate prioritized data traffic over a communications network via a fixed length data communication frame, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one ordinarily skilled in the art that the present invention may be practiced without these specific details. In other instances, well known methods, procedures, components, and circuits have not been described in detail as not to unnecessarily obscure aspects of the current invention.

The present invention is a system and method that permits higher priority data to be transmitted before lower priority data in a buffer queue. The present system and method enables the higher priority information to be transmitted in a manner that minimizes impacts to communication flow and conserves communication network resources. It is capable of being incorporated in existing communication networks in a manner that preserves the usefulness of current communication protocols while minimizing adverse affects on network infrastructure.

Figure 1:
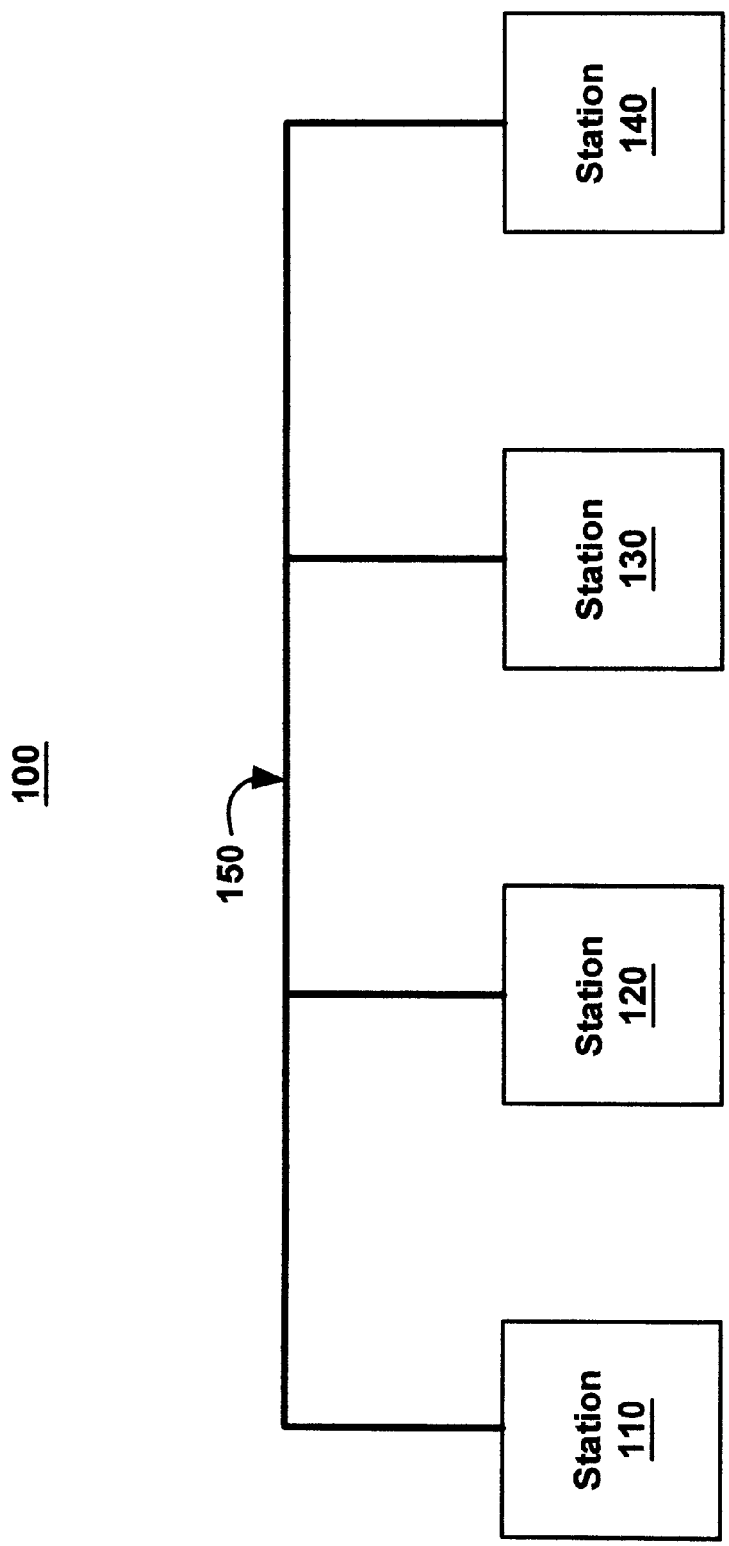
FIG. 1 is a block diagram of one embodiment of a communications network system utilizing fixed length data communication frames at a link level.

In one embodiment, the present invention is employed in a system utilizing a transmission protocol where data exchanges between peers involve fixed length data communication frames at a link level. FIG. 1 is a block diagram of one embodiment of a system utilizing fixed length data communication frames at a link level, communications network 100. Communications network 100 comprises a communication station 110, communication station 120, communication station 130, communication station 140, and communication medium 150. Communication medium 150 is electrically coupled to station 110, station 120, station 130 and station 140. Communication medium 150 comprises twisted pair cable, coaxial cable, fiber optic cable, fiber optical cable, radio frequency mediums, microwave frequency mediums, etc. Communication stations 110 through 140 are devices adapted to transmit and receive data over communication medium 150. When communicating with each other, stations 110 through 140 encapsulate data in fixed length frames. In one embodiment of the present invention, a data communication frame's length is explicitly defined via a length indicator in a frame.

FIG. 2A is a block diagram of one embodiment of a fixed length data communication frame 210. Fixed length frame 210 comprises a length indicator section 211, data section 212, and transmission status section 213. Length indicator section 211 includes the length or number of bits of fixed length frame 210. Data section 212 comprises the information one station is sending to another station. Transmission status section 213 comprises an indication of a transmission status, including errors in the transmission and indications if the transmission should be aborted. FIG. 2B is a block diagram illustrating another embodiment of a fixed length data communication frame 210 transmitting high priority data in a frame that was originally designated for use by low priority data. Fixed length frame 210 comprises high priority message indicator 214, high priority message 215, high priority message indicator 216, and abort data section 217. High priority message indicator 214 and 216 are a string of bits that operate to indicate high priority message information 215 is valid information that is not to be aborted. Aborted data section 217 comprises bits that are associated with low priority data included in fixed length frame 210 that is aborted. This embodiment allows low priority traffic to be supplanted with high priority traffic in fixed length frames.

Figure 3:
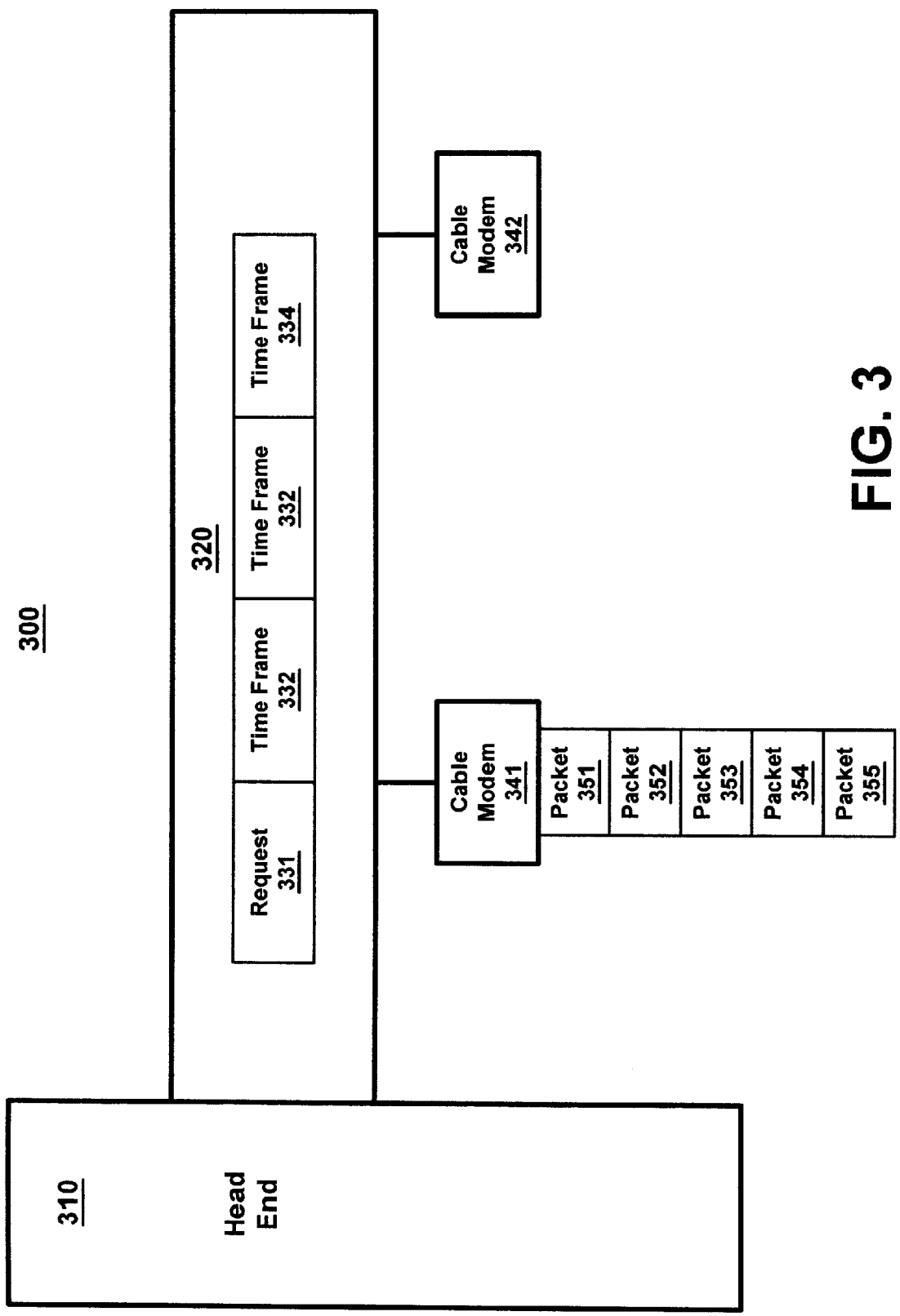
FIG. 3 is block diagram illustration of a cable data system for transmitting communications between a head end and cable modems.

FIG. 3 is a block diagram illustration of a cable data system 300. Cable data system 300 comprises head end component 310, cable 320, cable modem 341, cable modem 342, data packet 351, data packet 352, data packet 353, data packet 354, and data packet 355. Cable 320 comprises time frame 331, time frame 332, time frame 333, and time frame 334. Time frame 331 comprises a request from cable modem 341. Head end component 310 is coupled to cable 320, which is coupled to cable modem 341 and cable modem 342. Cable modem 341 is coupled to data packet 351, which is coupled to data packet 352. Data packet 353 is coupled to data packet 352 and data packet 354, which is coupled to data packet 355.

Head end component 310 is responsible for controlling communication exchanges and managing data transmissions on cable data system 300. For example, head end component 310 determines whether a cable modem is granted access to communication bandwidth on cable 320 and what communication bandwidth resources are assigned to which cable modem. Head end component 310 directs the transmission of data between itself and a cable modem over the communications network.

Cable 320 comprises a medium to convey information between components in cable data system 300. In one embodiment cable 320 comprises a coaxial cable spread over long distances of several miles and installed in both overhead and underground facilities. In another embodiment cable 320 comprises a combination of coaxial cable and fiber optic cable.

Cable modem 341 and 342 are data communication equipment devices that provide two-way interactive digitally networked communication exchanges. Cable modems 341 and 342 are coupled to other downstream devices (not shown) such as personal computers, digital televisions, digital telephones, digital network devices, etc. via one or more link connections. In one embodiment a cable modem simultaneously supports multiple services such as telephone connections and video service to a television. In another embodiment, a cable modem receives downstream signals via a single downstream channel and transmits upstream signals via a single upstream channel. Cable modem 341 and 342 modulate digital signals of downstream devices into analog signals that can be transmitted over cable 320 and demodulate analog signals on cable 320 into digital signals that are compatible with downstream devices.

Data packets in 351 through 355 comprise packages of information that are transmitted between head end unit 310 and cable modem 341. This information includes messages and commands, such as a request for service, control codes associated with session management and data (e.g., such as contents of a file). In the present embodiment, the information takes the form of a packet protocol data units (PDU) that are queued up in buffers (e.g. registers). As the information moves through the protocol layers of cable data system 300 each layer attaches information to a PDU that is relevant to its peer layer in other components of cable data system 300.

Time frame 331 through 334 function as allocations of communication bandwidth on cable 320. It takes a certain amount of time to send signals representing information over cable 320. Thus, when a device wants to send data over cable 320 it obtains access to cable 320 for certain periods of time such as time frames 331 through 334. The device inserts its data (e.g., data packets 351 and 352) on cable 320 during time frames it is granted.

Cable data system 300 maintains functional compatibility with a number of industry specifications and standards while providing added features that permit lower priority transmissions to be aborted and higher priority communications inserted onto cable 320. For example, cable data system 300 is compatible with multimedia cable network system (MCNS) data over cable standard interface specification (DOCIS) while permitting real time data to be placed onto cable 320 in an expedient manner. In one embodiment, the present invention utilizes media access control (MAC) frame format to maintain compatibility with industry standards and provide expedient communications.

Figure 4:
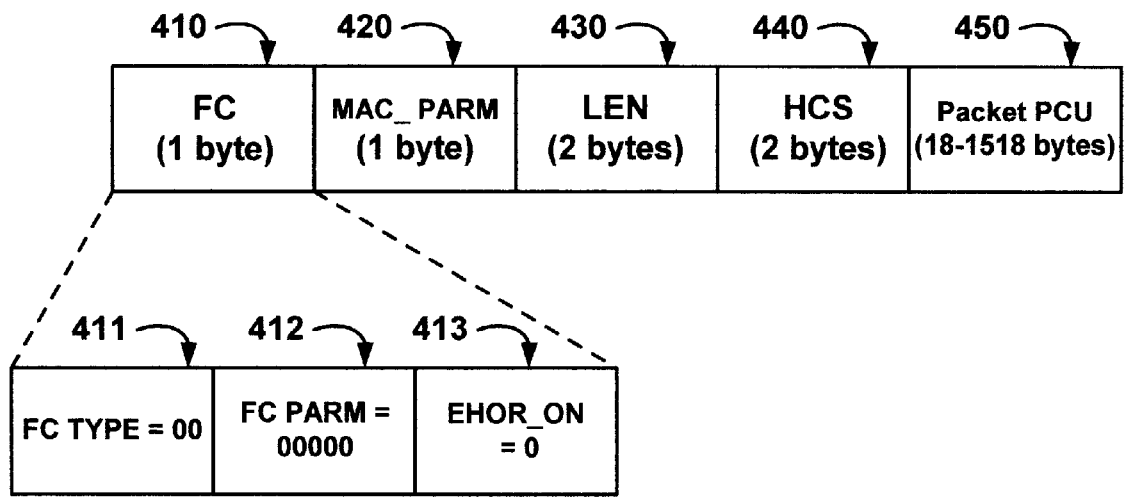
FIG. 4 is a block diagram illustrating the encoding of one embodiment of a data-over-cable MAC frame that is transmitted in a cable data communication network.

FIG. 4 is a block diagram illustrating the encoding of one embodiment of a data-over-cable MAC frame 400. Data-over-cable MAC frame 400 comprises FC section 410, MAC_PARM section 420, LEN section 430, HCS section 440, and Packet PDU 450. FC section 410 is coupled to MAC_PARM section 420, which is coupled to LEN section 430. LEN section 430 is coupled to HCS section 440, which is coupled to Packet PDU 450. FC section 410 comprises 1 byte of information that identifies the type of MAC header. The byte in FC section 410 comprises FC type bits 411, FC PARM bits 412 and EHDR_ON bits 413. In the present embodiment, FC type 411 bits are set to "00" indicating that MAC_PARM section 420 comprises 1 byte of information. LEN section 430 comprises 2 bytes indicating the length of the MAC frame. HCS section 440 comprises 2 bytes and indicates the MAC header check sequence. Packet PDU 450 is an Ethernet/ISO8802-3 type packet PDU comprising 18 to 1518 bytes representing data being transferred in the data over cable MAC frame 400.

Figure 5:
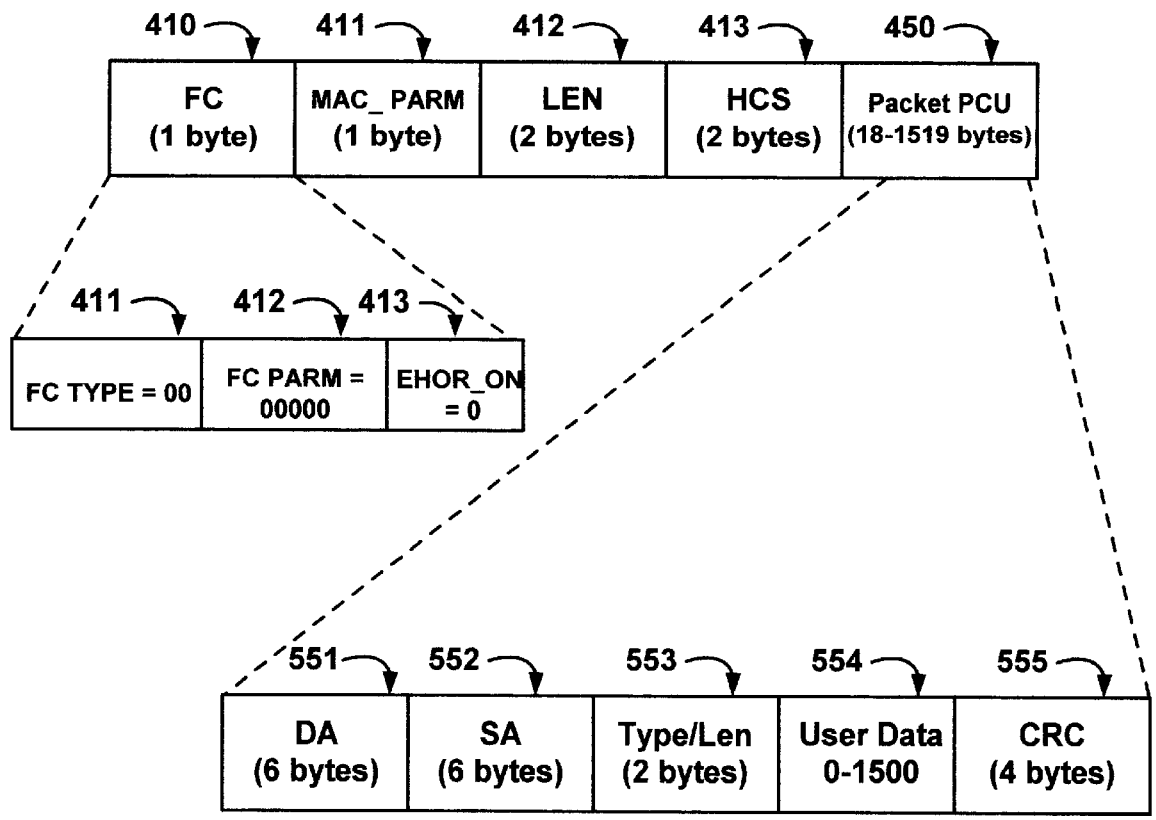
FIG. 5 is a block diagram illustrating one embodiment of data-over-cable MAC frame in which low priority traffic is transmitted.

FIG. 5 is a block diagram illustrating one embodiment of data-over-cable MAC frame 400. In this embodiment of data-over-cable MAC frame 400 packet PDU 450 includes a single packet PDU and comprises destination address (DA) section 551, source address (SA) section 552, type and length (type/len) section 553, user data section 544, and cyclical redundancy check (CRC) section 555. Destination address section 551 is coupled to source address section 552, which is coupled to type and length section 553. Type and length section 553 is coupled to user data section 544, which is coupled to cyclical redundancy check section 555. Destination address section 551 comprises an address of a destination the information is being sent to. Source address section 552 comprises an address the information is originating from. Type and length section 553 indicates the type of data being transmitted or its length in bytes. User data section 544 comprises the payload information being transmitted. Cyclical redundancy check section 555 comprises information on errors in data transmission.

Figure 6:
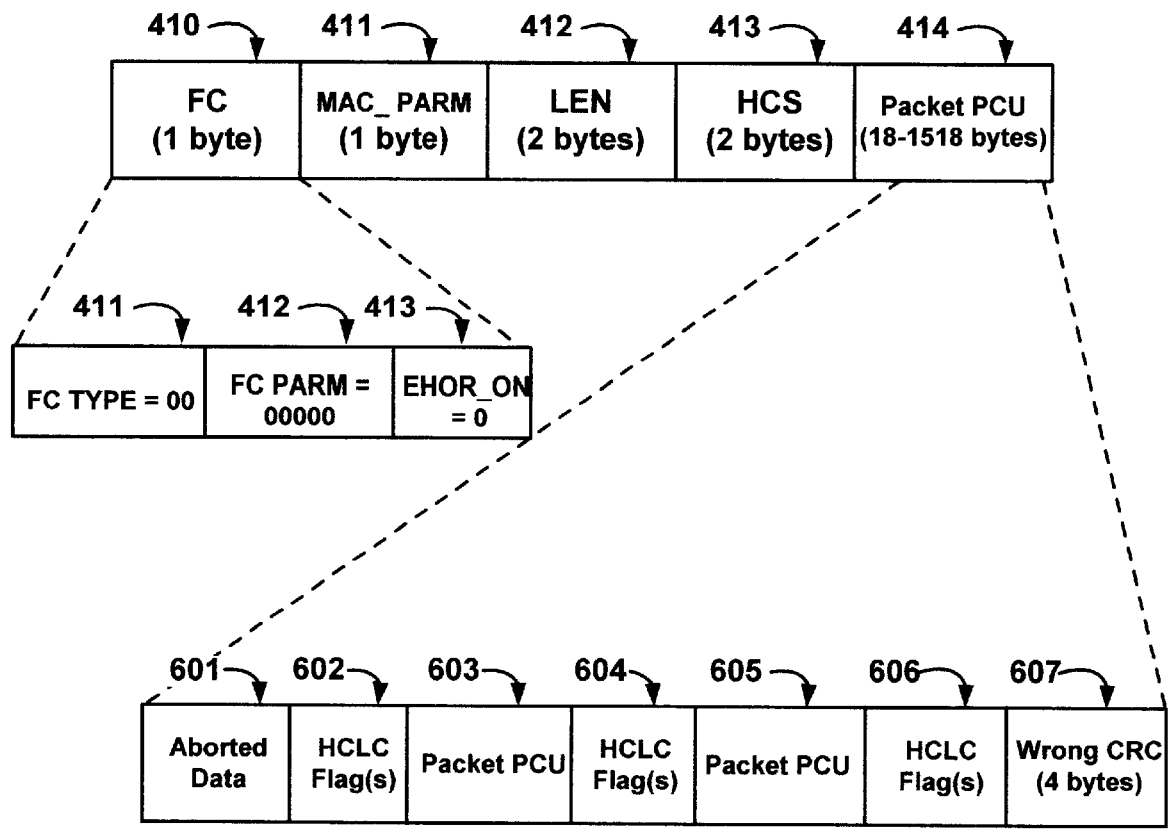
FIG. 6 is a block diagram illustrating another embodiment of data-over-cable MAC frame in which high priority traffic is transmitted.

FIG. 6 is a block diagram illustrating another embodiment of data-over-cable MAC frame 400. In this embodiment of data-over-cable MAC frame 400 packet PDU 450 comprises aborted data section 601, high level data link control (HDLC) flag sections 602, 604, and 606, packet PDU sections 603 and 605, and wrong cyclical redundancy check section 607. Aborted data section 601 is coupled to HDLC flag section 602, which is coupled to packet PDU section 603. HDLC flag section 604 is coupled to packet PDU section 603 and packet PDU section 605, which is coupled to HDLC flag section 606. HDLC flag section 606 is coupled to wrong cyclical redundancy check section 607. Aborted data section 601 comprises lower priority data that is to be aborted. HDLC flag section 602, 604, and 606 comprise HDLC flags, a specific sequence of bits (e.g., 01111110) that indicate the information between them is in a HDLC format. Packet PDU section 603 and 605 comprise higher priority information that a cable modem or a component coupled to the cable modem do not want discarded. Wrong cyclical redundancy check section 607 comprises a signal to head end component 310 to discard data in the frame.

In one embodiment of cable data network 300 communications are allocated to certain frequency ranges comprising channels. For example, a "downstream channel" and an "upstream channel" comprise spectral bandwidth, frequency, and other spectral characteristics required for transmitting and amplifying a signal in the respective upstream or downstream direction through a medium. A downstream communication flows from a head end to a cable modem, and an upstream communication flows from a cable modem to a head end. In one embodiment, the downstream is approximately 30 Mb per channel and the upstream is about 3 to 6 Mb. The present invention works for communications in both the upstream and downstream direction.

A data communication exchange between head end component 310 and cable modem 341 begins when cable modem 341 requests (e.g., request 331) access to a certain number of time frames (e.g. time frame 332) on cable 320. Cable modem 341 requests access to cable 320 because is has a packet (e.g. packet 351) to transmit. When cable modem 341 or cable modem 342 initiates a transmission by forwarding a request to head end component 310, if head end component 310 answers a signal exchange takes place that establishes the parameters for a communication session. This negotiation process determines the maximum bandwidth assigned to a cable modem for a transmission. The amount of bandwidth assigned to a cable modem is based on the number of packet PDUs that are queued in the cable modem's buffer and depends upon constraints (e.g. maximum bandwidth) and conditions (e.g., congestion) of communication system 300.

If there is available bandwidth or time frames, head end 310 sends a message downstream to cable modem 341 indicating a specified time frame or frames (e.g. time frame 332 and 333) that are available for cable modem 341 to use for transmission of data packets (e.g. data packets in 351 and 352). When the first of the time frames (e.g. time frame 332) assigned by head end 310 "rolls around" to cable modem 341, cable modem 341 inserts its data packet or packets (e.g., data packets 351 through 354) onto the communication medium (e.g. in the form of data over cable MAC frame 400). The actual packet placed on the communication medium by the cable modem may straddle over one time frame (e.g. 332) into another time frame (e.g., 333). Cable modem 341 may have more than one packet to insert onto cable 320.

In one example of communications in cable data system 300, after cable modem 341 sends a request up to head end 310, a no latency, real-time, high priority message data packet (e.g. data packet 353) is entered in a buffer queue. Cable modem 341 initially requests access based upon a data over cable MAC frame comprising low priority information (e.g. data packet 351 and 352) to be inserted in time frames 332 and 333. If higher priority information appears (e.g., data packet 353) before transmission of the data over cable MAC frame begins, cable modem 341 inserts an HDLC flag 604, packet PDU 605 and HDLC flag 606 in the data over cable MAC frame. After the insertion of high priority information, the data over cable MAC frame is similar to the configuration shown in FIG. 6, including aborted data section 601 (e.g., comprising portions of data packet 351 and/or 352), HDLC flag 604, packet PDU 605 and HDLC flag 606, which immediately precedes the CRC bytes. Thus instead of waiting for lower priority data to be cleared out of a buffer queue, at which time a cable modem would have to request additional time frames to accommodate the no latency real-time high priority data (e.g. multimedia data), time frames that are currently allocated to a cable modem are utilized.

In one embodiment of the present invention, a cable modem determines if there is sufficient bandwidth (e.g. time frames) to accommodate higher priority information. This embodiment is utilized in situations when the higher priority information is received by the cable modem after transmission of a data over cable MAC frame including lower priority information has begun. For example in a situation where cable modem 341 has begun the actual transmission of lower priority information (e.g. data packet 351) and then receives higher priority information (e.g. packet 353) before the transmission is complete, cable modem 341 establishes if enough "space" for high priority bits remains in allotted time frames (e.g. 332 and 333) to include the higher priority information. Cable modem 341 establishes if enough "space" remains in the allotted time frames by first determining the number of bits comprising higher priority data to be included in a "transformed" data over cable MAC frame. Cable modem 341 then calculates how much time is required to make a transformation and accommodate transmission of the bits in the transformed data over cable MAC frame. If the calculated time is less than or equal to the time remaining in the allotted time frames the transformation is performed and the transformed data over cable MAC frame is inserted in the allotted time frames.

In both of the examples above, the transformed data over cable MAC frame follows the same format. After the insertion of high priority information, the transformed data over cable MAC frame is similar to the configuration shown in FIG. 6, including aborted data section 601 (e.g., comprising portions of data packet 351 and/or 352), HDLC flag 604, packet PDU 605 and HDLC flag 606, which immediately precedes the CRC bytes. Based on the information in the data over cable frame after the insertion of the high priority, a CRC is calculated that is "incorrect" or "wrong". The "incorrect" CRC indicates the data over cable MAC frame includes information to be aborted or discarded. However, head end 310 is configured to recognize if a HDLC flag is immediately in front of CRC 607 and does not discard any packet PDU (e.g., packet PDU 605) in the data over cable MAC frame that is transmitted between two HDLC flags (e.g., HDLC flags 604 and 606).

The present invention is implemented in a variety of embodiments. For example in one embodiment, the "incorrect" CRC utilized in a high priority transmission is configured in a manner that indicates to the receiving station that high priority data is included in the payload. In another embodiment packet PDUs (e.g., packet PDU 605) transmitted between two HDLC flags (e.g., HDLC flags 604 and 606) comprise their own CRC in the packet PDU. These CRC's within the packet PDU are calculated based upon the information in the packet PDU and are utilized by the receiving component (e.g., head end 310) to determine if the packet PDU is valid. The additional CRC in a packet PDU addresses a situation in which there is no high priority information and a data over cable frame is to be entirely aborted and by coincidence there is a HDLC flag immediately preceding a CRC of the data over cable frame. An additional CRC is also utilized in systems that rely on a CRC being configured in a predetermined manner to indicated there is high priority information in the data over cable frame that is valid. In these systems a CRC in a packet PDU is utilized to address situations in which a value in a CRC for the entire cable over data MAC frame coincidentally just happens to be equivalent to the predetermined value.

Figure 7:
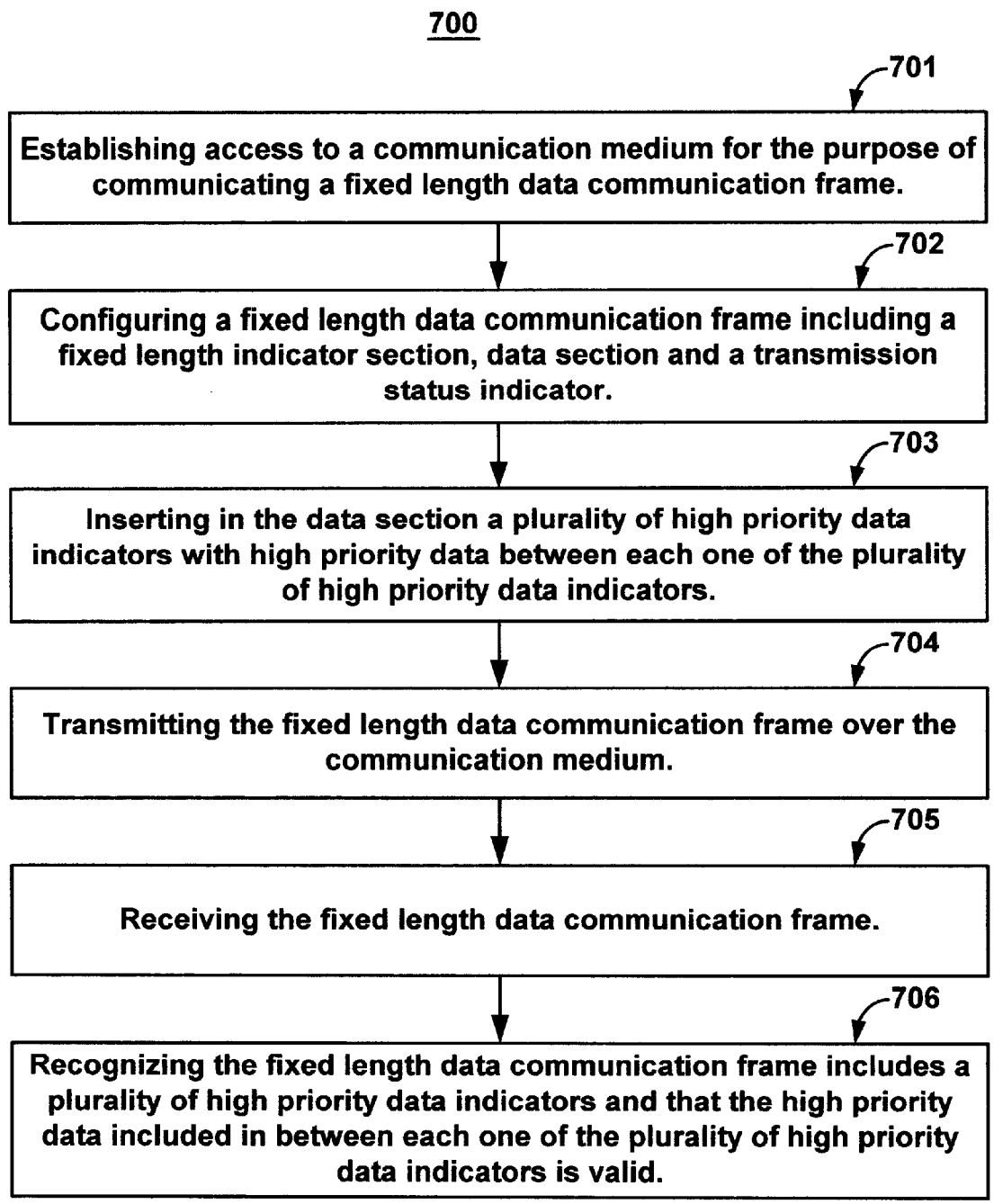
FIG. 7 is one embodiment of a method of the present invention for supplanting low priority data traffic with high priority data traffic.

FIG. 7 is one embodiment of a method of the present invention for supplanting low priority data traffic with high priority data traffic, prioritization method 700. Prioritization method 700 operates on data communication frames with fixed length specified in a frame header section. In one embodiment prioritization method 700 is utilized in a communications network system including a data over cable media access control frame with an Ethernet/ISO8802-3 type packet protocol data unit payload. Prioritization method 700 permits higher prioritized information to be transferred before lower prioritized information.

In Step 701 prioritization method 700 establishes access to a communication medium for the purpose of communicating a fixed length data communication frame. In one embodiment of prioritization method 700, establishing access to a communication medium is accomplished by requesting access from a head end component to time frames for transmitting a data over cable media access control frame. If the head end determines there are available time frames it grants a cable modem access to the available time frames for transmitting said data over cable media access control frame.

A fixed length data communication frame is configured in Step 702. This configuration includes a fixed length indicator section, a data section, and a transmission status indicator section. In one embodiment of prioritization method 700, configuring a fixed length data communication frame comprises the step of setting up a data over cable media access control frame with an Ethernet/ISO8802-3 type packet protocol data unit payload. In the same embodiment, this step also involves placing a cyclical redundancy check value in the transmission status section that indicates information in the data over cable media access control frame is to be aborted. In one example, the cyclical redundancy check value in the transmission status section indicates there is high priority data included in a protocol data unit packet between one of a plurality of high level data link control flags and another one of said plurality of high level data link control flags and said high priority data should not be aborted.

In Step 703 a plurality of high priority data indicators is inserted in the data section with high priority data between each one of the plurality of high priority data indicators. In one embodiment, inserting a plurality of high priority data indicators includes injecting a plurality of high level data link control flags into a data over cable media access control frame. Higher priority protocol data unit packets are put between one of said plurality of high level data link control flags and another one of said plurality of high level data link control flags.

A fixed length data communication frame is transmitted over the communication medium in Step 704. In one embodiment the transmission includes placing the fixed length data communication frame on a coaxial cable. In Step 705 the fixed length data communication frame is received (e.g., by a head end component).

In Step 706, prioritization method 700 recognizes when a fixed length data communication frame includes a plurality of high priority data indicators and that high priority data included in between each one the plurality of high priority data indicators is valid. To recognize this type of configuration, prioritization method 700 determines if a protocol data unit packet is between one of the plurality of high level indicator sections and another one of said plurality of high level indicator sections and by virtue of its location between the high level priority indicators considers it valid data. In one embodiment of prioritization method 700 each one of the plurality of high level indicator sections includes a high level data link control flag and a packet protocol data unit situated between high level data link control flags is accepted as valid.

In another embodiment, prioritization method 700 includes the step of installing protocol data unit packets in a buffer queue. After they are installed in a buffer queue, prioritization method 700 confirms if one of said protocol data unit packets includes higher data than other said protocol data unit packets. For example, a protocol data unit packets in a buffer queue includes real time multimedia information that is considered high priority data in the system prioritization method 700 is implemented on.

Thus, the system and method of the present invention permits replacement of lower priority data with higher priority data in fixed length communication protocol frames. The protocols utilized in the present invention are compatible with fixed length frame protocols (e.g., data over cable media access control frame with an Ethernet/ISO8802-3 type packet protocol data unit payload. The system and method of the present invention are capable of being incorporated in existing communication networks in a manner that preserves the usefulness of current communication protocols while minimizing adverse affects on network infrastructure. The present system and method enables the higher priority information to be transmitted in a manner that conserves communication network resources. They are deployable in existing infrastructures (e.g., coaxial cable systems) with only minor adaptations to devices or components enabling them to recognize appropriate high priority data indicators and accept data encapsulated by the high priority data indicators.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A communications network system, comprising:
a communication medium for conveying data;
a communication station coupled to said communication medium, said communication station adapted to transmit data over said communication medium in a fixed length data communication frame at a link level, said communication frame comprising:
   a plurality of high priority message indicators that encapsulate high priority data, a transmission status section for indicating a status of a data transmission; said transmission status section is coupled immediately after one of said plurality of high priority message indicators located in said fixed length data communication frame;
   an aborted data section of data that has a lower priority than said high priority data; said aborted data section is coupled to one of said plurality of high priority indicators;
   and a length indication section for indicating a length of said fixed length high priority data communication frame, said length indication section is coupled to said aborted data section.

2. The communications network system of claim 1 wherein said high priority data in said fixed length data communication frame at a link level comprises communication network control information.

3. The communications network system of claim 1 wherein said high priority data in said fixed length data communication frame at a link level comprises data related to operational constraints of downstream devices coupled to said cable modems.

4. The communications network system of claim 1 wherein said communication medium comprises a coaxial cable.

5. A data cable system comprising:

a cable that transmits a data over cable media access control frame with an Ethernet/ISO8802-3 type packet protocol data unit payload in which a cyclical redundancy check section is set to a wrong value that indicates there is data included in said data over cable media access control frame to be aborted and a first high level data link control section is coupled before said cyclical redundancy check section with a high priority packet protocol data unit section coupled before said first high level data link control section which is coupled to and preceded by a second high level data link control section that is coupled behind an aborted data section which is coupled to a leading data type and length section;

a head end component for controlling communication exchanges and managing data transmissions on said cable data system; said head end component being coupled to said cable; and a cable modem for providing two-way interactive digitally networked communication exchanges, said cable modem being coupled to said cable.

6. The data cable system of claim 5 wherein aborted data section comprises data that is a lower priority than data in said high priority packet protocol data unit section.

7. The data cable system of claim 5 wherein said data over cable media access control frame is complaint with an Ethernet/ISO8802-3 type packet protocol data unit payload is compliant with multimedia cable network system data over cable standard interface specification and permits real time data to be placed onto said cable before lower priority data.

8. The data cable system of claim 5 wherein said high priority packet protocol data unit section comprises communication network control information.

9. The data cable system of claim 5 wherein said high priority packet protocol data unit section comprises data related to operational constraints of downstream devices coupled to said cable modems.

10. The data cable system of claim 5 wherein said high priority packet protocol data unit section comprises data related to real time multimedia communications.

11. The data cable system of claim 5 wherein said cable comprises a coaxial cable.

12. The data cable system of claim 5 wherein said cable comprises a fiber optical cable.

13. In a data communication network, a method for transferring higher prioritized information before lower prioritized information, the method comprising the steps of:

a) establishing access to a communication medium for the purpose of communicating a fixed length data communication frame;

b) configuring said fixed length data communication frame including a fixed length indicator section, a data section, and a transmission status indicator section; wherein step b further includes the steps of:

placing a cyclical redundancy check value in said transmission status section that indicates information in said data over cable media access control frame is to be aborted; and setting said cyclical redundancy check to a predetermined value that indicates high priority data is included in a protocol data unit packets between one of a plurality of high level data link control flags and another one of said plurality of high level data link control flags and said high priority data should not be aborted;

c) inserting in said data section a plurality of high priority data indicators with high priority data between each one of said plurality of high priority data indicators;

d) transmitting said fixed length data communication frame over said communication medium;

e) receiving said fixed length data communication frame; and f) recognizing said fixed length data communication frame includes said plurality of high priority data indicators and that said high priority data included in between each one said plurality of high priority data indicators is valid.

14. The method of claim 13 wherein step a further comprises the steps of:

requesting access from a head end component to time frames for transmitting a data over cable media access control frame; and granting a cable modem access to time frames for transmitting said data over cable media access control frame.

15. The method of claim 13 wherein step b further comprises the step of setting up a data over cable media access control frame with an Ethernet/ISO8802-3 type packet protocol data unit payload.

16. The method of claim 15 wherein further comprises the steps of:

installing said protocol data unit packets in a buffer queue; and confirming if one of said protocol data unit packets includes higher data than other said protocol data unit packets.

17. The method of claim 13 wherein step c further comprises the steps of:

injecting a plurality of high level data link control flags into said data over cable media access control frame; and putting higher priority protocol data unit packets between one of said plurality of high level data link control flags and another one of said plurality of high level data link control flags, higher priority protocol data unit packets.

18. The method of claim 13 wherein step d further comprises the step of placing said fixed length data communication frame on a coaxial cable.

19. The method of claim 13 wherein step f further comprises the steps:

determining if a protocol data unit packet is between one of said plurality of high level indicator sections and another one of said plurality of high level indicator sections, said each one of said plurality of high level indicator sections including a high level data link control flag; and accepting said packet protocol data unit if it is situated between high level data link control flags.

20. The method of claim 13 wherein high priority data comprises real time multimedia information.

* * * * *